United States Patent
Jin

(10) Patent No.: US 11,102,148 B2
(45) Date of Patent: Aug. 24, 2021

(54) METHOD TO GENERATE STABLE AND RELIABLE 6TISCH ROUTING PATHS

(71) Applicant: Kabushiki Kaisha Toshiba, Minato-ku (JP)

(72) Inventor: Yichao Jin, Bristol (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 20 days.

(21) Appl. No.: 16/557,561

(22) Filed: Aug. 30, 2019

(65) Prior Publication Data
US 2021/0067462 A1    Mar. 4, 2021

(51) Int. Cl.
| H04L 12/947 | (2013.01) |
| H04L 12/721 | (2013.01) |
| H04B 1/715 | (2011.01) |
| H04L 12/707 | (2013.01) |

(52) U.S. Cl.
CPC .......... *H04L 49/25* (2013.01); *H04B 1/715* (2013.01); *H04L 45/124* (2013.01); *H04L 45/22* (2013.01); *H04B 2001/7154* (2013.01)

(58) Field of Classification Search
CPC ........ H04L 49/25; H04L 45/124; H04L 45/22
See application file for complete search history.

(56) References Cited

U.S. PATENT DOCUMENTS

| 2003/0021233 A1* | 1/2003 | Fabre ............... H04L 45/124 370/238.1 |
| 2015/0023205 A1 | 1/2015 | Vasseur et al. |
| 2017/0099218 A1* | 4/2017 | Holcombe ............ H04L 45/48 |
| 2018/0176134 A1* | 6/2018 | Pignataro ............ H04L 47/12 |

FOREIGN PATENT DOCUMENTS

WO    WO 2016/014331 A1    1/2016

OTHER PUBLICATIONS

U.S. Appl. No. 16/183,110, filed Nov. 7, 2018, Jin, Y.
(Continued)

*Primary Examiner* — Elton Williams
(74) *Attorney, Agent, or Firm* — Oblon, McClelland, Maier & Neustadt, L.L.P.

(57) ABSTRACT

A device for computing a routing path from a source node to a destination node across a 6TISCH mesh network comprising a plurality of nodes, the device comprising: an interface for communicating with one or more nodes in the network; a memory configured to store data regarding the stability and availability of individual nodes in said network to receive packet data; a controller configured to: employ said data regarding the stability and availability of individual nodes in said network to receive packet data to calculate a path stability metric for each of a plurality of potential routing paths between said source node and said destination node, employ said path stability metric to select one of said plurality of potential routing paths for data transmission between said source node and said destination node, and cause said interface to transmit a signal configured to cause said plurality of nodes to transmit data from said source node to said destination node via said selected route.

7 Claims, 6 Drawing Sheets

| Path | Link Step increase | Availability | | Rank increase | Overall Rank |
|---|---|---|---|---|---|
| | $Rf \times Sp + Sr$ | $p_a$ | $Sa^* \widetilde{H}_2(p_a)$ | | |
| B-A | 1 | 90% | 2.345 | 3.345 | 3.345 |
| C-A | 1 | 50% | 5 | 6 | 6 |

| Path | Link Step increase | Availability | | Rank increase | Overall Rank |
|---|---|---|---|---|---|
| | $Rf \times Sp + Sr$ | $p_a$ | $Sa^* \widetilde{H}_2(p_a)$ | | |
| D-B | 2 | 90% | 2.345 | 4.345 | 7.69 |
| D-C | 1 | 50% | 5 | 6 | 12 |

- Node C has better link compared with Node B
- Node C is less available than Node B
- Overall, Node B' rank is less (better) than Node C.

(56) References Cited

OTHER PUBLICATIONS

Alotaibi, E. et al. "A survey on routing algorithms for wireless Ad-Hoc and mesh networks" Computer Networks, Elsevier, vol. 56, No. 2, 2012, pp. 940-965.
"IPv6 over the TSCH mode of IEEE 802.15.4e (6tisch)" IETF, https://datatracker.ietf.org/wg/6tisch/charter/, 2015, 4 pages.
Farahani, S. "ZigBee Wireless Networks and Transceivers" Newnes, 2008, 364 pages.
Kim, A.N. et al. "When HART Goes Wireless: Understanding and Implementing the WirelessHART Standard" IEEE, 2008, pp. 899-907.
Dujovne, D. et al. "6TiSCH 6top Scheduling Function Zero (SF0)" IETF, https://www.ietf.org/archive/id/draft-ietf-6tisch-6top-sf0-05.txt, 2017, 13 pages.
Winter, T. et al. "RPL: IPv6 Routing Protocol for Low-Power and Lossy Networks (rfc 6550)" IEFT, https://www.ietf.org/rfc/rfc6550.txt, 2012, 138 pages.
Thubert, P. "Objective Function Zero for the Routing Protocol for Low-Power and Lossy Networks (RPL)" IETF, RFC 6552, https://tools.ietf.org/html/rfc6552, 2012, 14 pages.
Yanggratoke, R. et al. "Predicting Real-time Service-level Metrics from Device Statistics" IFIP/IEEE International Symposium on Integrated Network Management, 2015, 10 pages.
An, B. et al. "An Entropy-Based Model for Supporting and Evaluating Route Stability in Mobile Ad hoc Wireless Networks" IEEE Communications Letters, vol. 6, No. 8, 2002, pp. 328-330.
Alvarez, C.F. et al. "Using Link Disconnection Entropy Disorder to Detect Fast Moving Nodes in MANETs" PLOS ONE, vol. 11, No. 5, 2016, 15 Pages.
Sun, B. et al. "An Energy Entropy-Based Minimum Power Cost Multipath Routing in MANET" International Journal of Grid and Distributed Computing, vol. 9, No. 2, 2016, pp. 169-180.
Miettinen, K.M. "Nonlinear Multiobjective Optimization" International Series in Operations Research & Management Science, vol. 12, 1998, 304 Pages.

\* cited by examiner

METHOD TO GENERATE STABLE AND RELIABLE 6TISCH ROUTING PATHS

FIELD

Embodiments described herein relate generally to methods and devices for communicating in 6TiSCH networks.

BACKGROUND

Industrial monitoring and control applications often involve expensive cabling to connect a large number of devices and sensor units across an industrial plant, which can be quite expensive to install, operate and maintain. On the other hand, a wireless IoT (Internet of Things) network is a much cheaper alternative with many attractive features including minimal infrastructure requirements, lower cost, little wear and tear, and more flexibility and accessibility, compared to using wires.

Low power and lossy networks (LLNs) are a type of wireless sensor network in which the nodes are highly resource constrained and the communication link is highly variable. In a low power and lossy network the sensor nodes are typically limited in terms of processing power, battery and/or memory and are likely to be operating in a highly variable wireless environment with low data and packet delivery rates.

IEEE 802.15.4 is a communications standard which has been specifically designed with low-rate wireless personal area networks in mind. However, conventional IEEE 802.15.4-2003 standard based wireless solutions such as ZigBee may not be able to meet industrial grade performance, particularly in terms of reliability and latency, due to higher vulnerability to multi-path fading environments and little resilience against external interference from other networks such as WiFi. In 2007, The ZigBee Alliance released ZigBee PRO, which added the protocol's capability to switch the entire network to a different channel when its link quality reduces due to interference. Frequency hopping, on the other hand, is a more robust technology for frequency agility compared with ZigBee PRO, which was adopted by industrial standards such as WirelessHART and ISA100.11a, but it requires substantial modifications to the IEEE 802.15.4 MAC.

More recently, mesh networks based on IEEE 802.15.4-2015 Time Synchronized Channel Hopping (TiSCH) have been instrumental in achieving the stringent communication requirements of many industrial applications as such networks show resilience to multipath fading and interference.

The latest Internet Engineering Task Force (IETF) 6TiSCH standard (IPv6 over IEEE 802.15.4e TiSCH mode) is an emerging standard that aims at harmonizing the industrial and information technology worlds by bridging the gap between IP-enabled upper protocol stack with the underlying TiSCH-based link layer. 6TiSCH is expected to be the de-facto standard for a variety of Industrial IoT applications.

Both centralised and decentralised routing protocols can be employed in 6TiSCH mesh networks. In a centralised routing protocol, a 6TiSCH track, defined as a directed path from a source 6TiSCH node to one or more destination(s) 6TiSCH node(s) across a 6TiSCH mesh network, is calculated by a centralised Path Computation Element (PCE). The PCE computes both an optimized routing path and corresponding schedule for 6TiSCH track allocation. In a decentralised routing protocol, routing topology is determined at the local (node) level.

Existing routing protocols take account of a variety of factors such as link quality, energy efficiency, load balancing, network lifetime extension, latency and packet delivery ratio. There is a continuing need to improve the routing of packets in a 6TiSCH mesh network.

Arrangements of the present invention will be understood and appreciated more fully from the following detailed description, made by way of example only and taken in conjunction with drawings in which.

DETAILED DESCRIPTION

Figure 1:
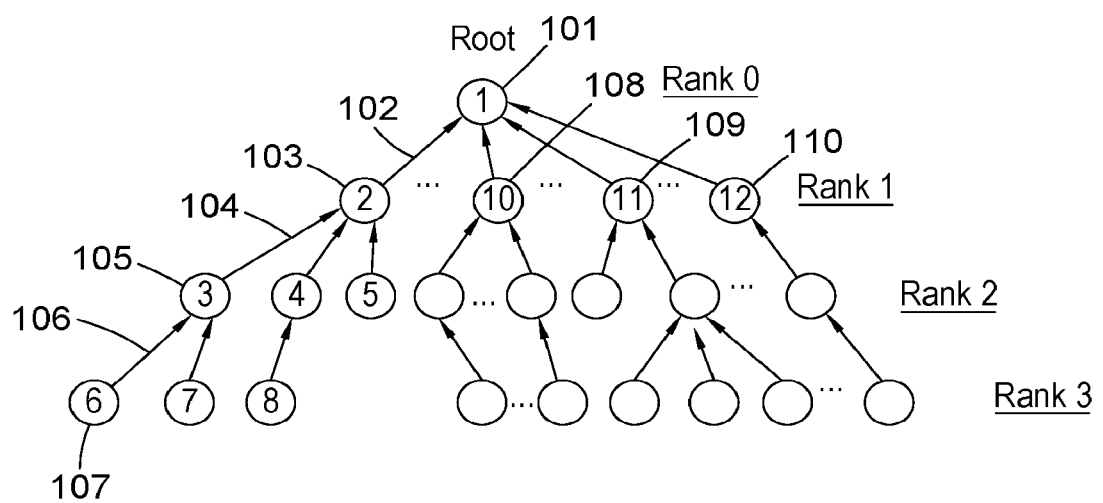
FIG. 1 shows an exemplary Destination Orientated Directed Acrylic Graph (DODAG)

In an embodiment, a device for computing a routing path from a source node to a destination node across a 6TISCH mesh network comprising a plurality of nodes is provided. The device comprises: an interface for communicating with one or more nodes in the network; a memory configured to store data regarding the stability and availability of individual nodes in said network to receive and transmit packet data; a controller configured to: employ said data regarding the stability and availability of individual nodes in said network to receive and transmit packet data to calculate a path stability metric for each of a plurality of potential routing paths between said source node and said destination node, employ said path stability metric to select one of said plurality of potential routing paths for data transmission between said source node and said destination node, and cause said interface to transmit a signal configured to cause said plurality of nodes to transmit data from said source node to said destination node via said selected route.

The device may be a hardware device. The device may be a virtual device that exists only in software form. The device may exist as a software module in the root node of the network. The device may exist as a software module that exists in the backend cloud of the network. The device may be a Path Computation Element (PCE).

The 6TiSCH network may be IPv6 over IEEE 802.15.4e TSCH mode as standardised by the Internet Engineering Task Force (IETF).

The data regarding the stability and availability of individual nodes in the network to receive and transmit packet data may comprise the probability that a path between two nodes within the network is consistently accessible during a given operation period. For a path to be consistently accessible between two nodes. The path between two nodes i and j may be accessible if node j is available to receive data transmitted from node i. The path between nodes i and j may be accessible if node j is available to receive data transmitted from node i and to retransmit that data towards the destination node. The nodes in the network may be hardware resources or virtual resources.

Employing said path stability metric to select one of said plurality of potential routing paths for data transmission between said source node and said destination node may comprise selecting the routing path in which nodes are most likely to be consistently available. Employing said path stability metric to select one of said plurality of potential routing paths for data transmission between said source node and said destination node may comprise considering stability as one option amongst several others.

The data regarding the stability and availability of individual nodes in the network to receive and transmit packet data may be contained in a database. The database may be updated periodically. The IETF Traffic Engineering Architecture and Signaling (TEAs) protocol, or any other method suitable for transmitting node status information from a node to a Path Computation Element in a 6TiSCH network may be implemented in order to obtain information from the nodes in the network in order to update the database.

The signal configured to cause said plurality of nodes to transmit data from said source node to said destination node via said selected route may be transmitted according to the IETF lightweight PCEP protocol, according to CCAM GMPLS formats and procedures, or by any other method suitable for transmitting route information from a Path Computation Element to a node in a 6TiSCH network.

The nodes may be configured to store details of the computed routing path. The nodes may be configured to receive the signal containing details of the computed route and and store the details in a local memory. The nodes may be configured to store details of the computed routing path until the node receives data to be transmitted to the destination node. The data to be transmitted to the destination node may be received from another node in the network or it may be data obtained by the node itself, for example if the node has sensor functionality.

The network may be arranged as a DODAG. The destination node may be the root node of the DODAG.

The controller may be configured to employ the path stability metric to select one of said potential routing paths for data transmission between said source node and said destination node by choosing the path with a value of said stability metric corresponding to the path with greatest availability.

The controller may be configured to calculate a path stability metric for each of a plurality of potential routing paths between said source node and said destination node by calculating the path entropy for each potential routing path. The controller may calculate the path entropy for each hop between nodes in each potential rooting path. The controller may employ a binary entropy function. The controller may employ a modified binary entropy function.

The path entropy H(SL) for a routing path $\mathcal{P} = \{i_0 i_1, i_2, \ldots i_n i_{n-1}\}$ may be calculated using the following equation:

$$H(SL) = \sum_{ij \in \mathcal{P}} H(SL_{ij}) = \sum_{ij \in \mathcal{P}} \tilde{H}_2(p_{a_{ij}})$$

where $$\tilde{H}_2(x) = \begin{cases} -x \log_2 x - (1-x) \log_2(1-x) & 0 \le x \le 0.5 \\ 1 & \text{otherwise} \end{cases},$$

$SL_{ij}$ is a Bernoulli random variable that indicates whether or not the path between nodes i and j is inaccessible ($SL_{ij}=1$) or accessible ($SL_{ij}=0$), and $p_{a_{ij}}$ is the probability that the path between nodes i and j is accessible. The path between nodes i and j may be accessible if node j is available to receive data transmitted from node i. The path between nodes i and j may be accessible if node j is available to receive data transmitted from node i and to retransmit that data towards the destination node.

In another embodiment, a device for computing a routing path from a source node to a destination node across a 6TISCH mesh network comprising a plurality of nodes is provided. The device comprises: an interface for communicating with one or more nodes in the network; a memory configured to store data regarding the packet loss rate between individual nodes in the network; a controller configured to: employ said data regarding the packet loss rate between individual nodes in the network to receive and transmit packet data to calculate a path stability metric for each of a plurality of potential routing paths between said source node and said destination node, employ said reliability metric to select one of said plurality of potential routing paths for data transmission between said source node and said destination node, and cause said interface to transmit a signal configured to cause said plurality of nodes to transmit data from said source node to said destination node via said selected route.

The reliability metric may comprise the end-to-end packet loss rate. The reliability metric may comprise the average number of retransmissions on a routing path before successful end-to-end transmission is achieved. The reliability metric may comprise the maximum edge retransmission saturation probability.

Employing the reliability metric to select one of said potential routing paths for data transmission between said source node and said destination node may comprise choosing the path with a value of said reliability metric corresponding to greatest reliability.

In another embodiment, a device for computing a routing path from a source node to a destination node across a 6TISCH mesh network comprising a plurality of nodes is provided, the device comprising: an interface for communicating with one or more nodes in the network; a memory configured to store data regarding the stability and availability of individual nodes in said network to receive and transmit packet data and data regarding the packet loss rate between individual nodes in the network; a controller configured to: employ said data regarding the stability and availability of individual nodes in said network to receive and transmit packet data to calculate a path stability metric for each of a plurality of potential routing paths between said source node and said destination node, employ said path stability metric to select one of said plurality of potential routing paths for data transmission between said source node and said destination node, employ said data regarding the packet loss rate between individual nodes in the network to calculate a path reliability metric for a plurality of potential routing paths between said source node and said destination node, employ said reliability metric in combination with the path stability metric to select one of said plurality of potential routing paths for data transmission between said source node and said destination node and cause said interface to transmit a signal configured to cause said plurality of nodes to transmit data from said source node to said destination node via said selected route.

The controller may be configured to employ said path stability metric in combination with said reliability metric to select one of said plurality of potential routing paths for data transmission between said source node and said destination node by applying a single-objective optimization approach. The stability metric and the reliability metric may be combined as a weighted sum of metrics. One of said plurality of potential routing paths may be selected by minimizing a weighted sum of the stability and accessibility metrics.

The controller may be configured to employ said path stability metric in combination with said reliability metric to select one of said plurality of potential routing paths for data transmission between said source node and said destination node by applying a multi-objective optimisation approach. The controller may be configured to determine the set of paths that satisfy Pareto optimality with regard to the stability metric and the reliability metric. The controller may be configured to determine the non-dominated set of paths. The controller may be configured to select a single path from the Pareto optimal set of paths heuristically.

In an embodiment, a wireless device for wireless transmission over a 6TISCH mesh network is provided, the network comprising a plurality of nodes configured to forward messages towards and away from a root node, wherein the nodes are each assigned a rank, the rank assigned to each node determining the path by which messages are forwarded towards the root node, the wireless device comprising: a wireless interface for wirelessly communicating with nodes in the network; a controller configured to: receive, via the wireless interface a message from a first node, wherein said message comprises first information, wherein said first information relates to the rank of the first node and the stability and availability of the first node to receive messages from the wireless device; receive, via the wireless interface a message from a second node, wherein said message comprises second information, wherein said second information relates to the rank of the second node and the stability and availability of the second node to receive messages from the wireless device; select, on the basis of said first information and said second information whether to forward a message towards the root node via the first node or via the second node; cause said interface to transmit said message to the selected node.

The wireless device may be a hardware device or a virtual device. The first and second nodes may be hardware devices or virtual devices. The wireless device may be a sensor in a network of sensors. The wireless device may form part of an Internet of Things network. The wireless device may be configured to operate in accordance with the IETF 6 TiSCH standard.

The 6TiSHCH network may be any network which uses an RPL based routing protocol.

The messages received from the first and second nodes may be DIO messages.

The rank of a node may increase as the distance from the root node increases. The rank of a node may increase as the abstract distance from the root node increases. The rank of a node may increase as the number of hops from the root node increases. The rank of a node many increase the number of hops in a transmission path from the relevant node to the root node increases. The rank of a node may increase as the number of times the message must be forwarded in order to reach the root node increases. The rank may increase as link quality with the root node decreases.

The stability and availability of the first node and the second node may comprise the probability that the path between the wireless device and the first node or the second node, as appropriate, is consistently accessible during a given operation period. The path between two nodes i and j may be accessible if node j is available to receive data transmitted from node i. The path between nodes i and j may be accessible if node j is available to receive data transmitted from node i and to retransmit that data towards the root node.

Selecting, on the basis of the first information and said second information whether to forward a message towards the root node via the first node or via the second node, may comprise selecting to forward the message via the node with greatest stability and availability.

Selecting on the basis of said first and second information whether to forward a message towards the root node via the first node or via the second node may comprise calculating a first entropy for transmission of information between the wireless device and the first node and a second entropy for the transmission of information between the wireless device and the second node, calculating a first rank for the wireless device as a function of the first entropy and the rank of the first node, wherein said first rank increases as said first entropy and/or said first rank of the first node from the root node increases, calculating a second rank for the wireless device as a function of the second entropy and the rank of the second node, wherein said second rank increases as said second entropy and/or said rank of the second node, and selecting to forward a message towards the root node via the first node if the first rank is lower than the second rank and selecting to forward a message towards the root node via the second node if the second rank is lower than the first rank.

The entropy may be calculated using a binary entropy function. The entropy may be calculated using a modified binary entropy function. The entropy may be calculated according to the following equation:

$$\tilde{H}_2(x) = \begin{cases} -x \log_2 x - (1-x) \log_2(1-x) & 0 \leq x \leq 0.5 \\ 1 & \text{otherwise} \end{cases}$$

where x is the probability that the transmission of information between the wireless device and the first node or the second node, as appropriate, is possible.

In an embodiment, a method for computing a routing path from a source node to a destination node across a 6TISCH mesh network comprising a plurality of nodes is provided, the method comprising: employing data regarding the stability and availability of individual nodes in said network to receive and transmit packet data to calculate a path stability metric for each of a plurality of potential routing paths between said source node and said destination node, employing said path stability metric to select one of said plurality of potential routing paths for data transmission between said source node and said destination node.

In an embodiment, a method of selecting a parent node for a wireless device from a plurality of nodes in a 6TiSCH network is provided, wherein the nodes are configured to forward messages towards and away from a root node, wherein the nodes are each assigned a rank, the rank assigned to each node determining the path by which messages are forwarded towards the root node, the method comprising: receiving, a message from a first node, wherein said message comprises first information, wherein said first information relates to the rank of the first node and the stability and availability of the first node to receive messages from the wireless device; receiving a message from a second node, wherein said message comprises second information, wherein said second information relates to the rank of the second node from the root node and the stability and availability of the second node to receive messages from the wireless device; and selecting a parent node for the wireless device on the basis of said first and second information.

In an embodiment, a wireless network is provided, the wireless network comprising a device for computing a routing path from a source node to a destination node across a 6TISCH mesh network comprising a plurality of nodes, the device comprising: an interface for communicating with one or more nodes in the network; a memory configured to store data regarding the stability and availability of individual nodes in said network to receive and transmit packet data; a controller configured to: employ said data regarding the stability and availability of individual nodes in said network to receive and transmit packet data to calculate a path stability metric for each of a plurality of potential routing paths between said source node and said destination node, employ said path stability metric to select one of said plurality of potential routing paths for data transmission between said source node and said destination node, and cause said interface to transmit a signal configured to cause said plurality of nodes to transmit data from said source node to said destination node via said selected route.

In an embodiment, a wireless network comprising a plurality of wireless devices is provided, each wireless device being a wireless device for wireless transmission over a 6TISCH mesh network, the network comprising a plurality of nodes configured to forward messages towards and away from a root node, wherein the nodes are each assigned a rank, the rank assigned to each node determining the path by which messages are forwarded towards the root node, the wireless device comprising: a wireless interface for wirelessly communicating with nodes in the network; a controller configured to: receive, via the wireless interface a message from a first node, wherein said message comprises first information, wherein said first information relates to the rank of the first node and the stability and availability of the first node to receive messages from the wireless device; receive, via the wireless interface a message from a second node, wherein said message comprises second information, wherein said second information relates to the rank of the second node and the stability and availability of the second node to receive messages from the wireless device; select, on the basis of said first information and said second information whether to forward a message towards the root node via the first node or via the second node; cause said interface to transmit said message to the selected node.

In an embodiment, a computer readable medium is provided, the computer readable medium comprising instructions that, when executed by a processor, cause the processor to enact a method for computing a routing path from a source node to a destination node across a 6TISCH mesh network comprising a plurality of nodes, the method comprising: employing data regarding the stability and availability of individual nodes in said network to receive and transmit packet data to calculate a path stability metric for each of a plurality of potential routing paths between said source node and said destination node, employing said path stability metric to select one of said plurality of potential routing paths for data transmission between said source node and said destination node.

In an embodiment, a computer readable medium is provided, the computer readable medium comprising instructions that, when executed by a processor, cause the processor to enact a method for selecting a parent node for a wireless device from a plurality of nodes in a 6TiSCH network, wherein the nodes are configured to forward messages towards and away from a root node, wherein the nodes are each assigned a rank, the rank assigned to each node determining the path by which messages are forwarded towards the root node, the method comprising: receiving, a message from a first node, wherein said message comprises first information, wherein said first information relates to the rank of the first node and the stability and availability of the first node to receive messages from the wireless device; receiving a message from a second node, wherein said message comprises second information, wherein said second information relates to the rank of the second node from the root node and the stability and availability of the second node to receive messages from the wireless device; and selecting a parent node for the wireless device on the basis of said first and second information.

FIG. 1 shows an example of a multi-hop network utilising 6TiSCH and a schedule for transmissions across the network. In 6TiSCH the network topology is arranged in a tree-link structure and is optimised for communications to and from a single point, known as the root node (101). In FIG. 1, the routing topology is organized as a Destination-Orientated Directed Acyclic Graph (DODAG).

A DODAG is a type of Directed Acrylic Graph (DAG). As known in the art, a Directed Acrylic Graph (DAG) is a type of graph where no cycles exist (i.e. there is no sequence of paths from a node that eventually loop back to the same node). The DODAG is a type of Directed Acrylic Graph (DAG) that is rooted at a single node: the root node. The root node is a node at which all paths terminate, i.e. it is a node of the DODAG with no outgoing paths or edges. DODAG routing topologies can be formed by either centralised or distributed routing algorithms.

The wireless network of FIG. 1 comprises nodes 103, 105, 107, 108, 109, 110, and route node 101. Each node is 103, 105, 107, 108, 109, 110 capable of communicating wirelessly with other nodes 103, 105, 107, 108, 109, 110 (or the root 101) within communication range. This is indicated in FIG. 1 by edges 102, 104, 106. The root 101 is also a wireless node, in that it is able to communicate wirelessly with nodes 103, 105, 107, 108, 109, 110 within its transmission range. Each node 103, 105, 107, 108, 109, 110 (including the root 101) is assigned its own unique node identifier (node ID).

The root 101 is effectively the ultimate destination for all communications. That is, all transmissions in the network are directed through the network towards the root 101, which acts as a hub for all communications in the network. Transmissions are forwarded through the network by intermediate (relay) nodes 103, 105, 107, 108, 109, 110 via a multi-hop system. The root 101 receives the forwarded messages and may be able to perform processes based on the transmissions and/or can forward on the messages to a further device or network, e.g. via the internet.

In the routing topology shown in FIG. 1, dedicated communication links between nodes 103, 105, 107, 108, 109, 110 or the hub 101 are shown as links between the respective nodes. The routing topology is calculated and a schedule is assigned in order to schedule the transfer of data from the nodes 103, 105, 107, 108, 109, 110 towards the root 101. Data packets are sent from outer nodes 107 to nodes 105, 103 closer to the sink 101, which in turn forward the data packets on to the sink 101 (if within range) or to further nodes. Each transmission from one node 103, 105, 107, 108, 109, 110 to another is called a hop. The nodes 103, 105, 107, 108, 109, 110 are divided up into layers based, for instance, on their minimum hop distance to the root 101.

In the present example, a first node 107 is located on the outer edge of the network, second 105 and third nodes 103 are located further in the network and the root 101 is located beyond the second 105 and third 103 nodes. The first node 106 has a communication link 106 assigned to the second node 105 that in turn has a communication link 104 with third node 103. The third node has a communication link 102 with the root 101. Other nodes 108, 109 and 110 also have their own communication links with the root 101. Each communication link is between only two nodes.

Figure 2A:
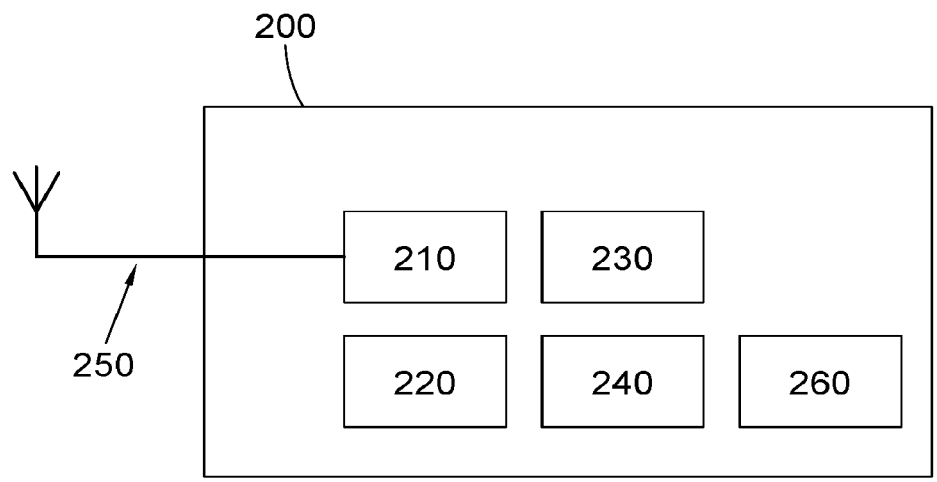
FIG. 2A shows a device 200 which forms a node of the sensor network according to an embodiment.

FIG. 2A shows a device 200 that forms a node of the sensor network according to an embodiment. The device 200 comprises an input/output module 210, a microprocessor 220, a non-volatile memory 230 and a sensor module 240. The input/output module 210 is communicatively connected to an antenna 250. The antenna 250 is configured to receive signals from, and transmit signals to, other nodes in the sensor network. The microprocessor 220 is coupled to the input/output module 210 and to the non-volatile memory 230. The non-volatile memory 230 stores computer program instructions that, when executed, cause the processor 220 to execute program steps that implement the methods described herein. The processor 220 is also coupled to the sensor module 240 that is configured to generate information for transmission across the network including, but not limited to, measurements of an industrial process and changes in an environment within which the device 200 operates. Alternatively or additionally to the sensor module 240, the device 200 can contain an actuator module 260. The actuator module 260 is coupled to the microprocessor 220 and is configured to move or control a mechanism external to the device 200.

In one embodiment the device 200 is configured to operate in accordance with the IETF 6TiSCH (IPv6 over IEEE 802.15.4e TSCH mode) standard.

Whilst in the embodiment described above the antenna 250 is shown to be situated outside of, but connected to, the device 200 it will be appreciated that in other embodiments the antenna 250 forms part of the device 200.

Figure 2B:
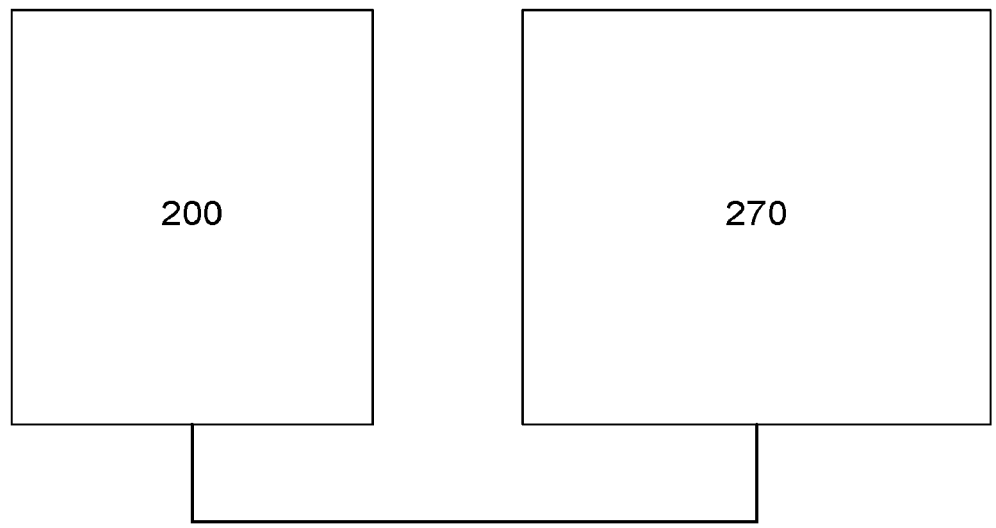
FIG. 2B shows a system comprising the device 200, communicatively connected to a computing system 270.

FIG. 2B shows a system comprising the device 200, communicatively connected to a computing system 270. In an embodiment the connection between the two systems is established via an additional output port (not shown) of the device 200. The computing system 270 may, in one embodiment, be part of an industrial control system, with the device 200 acting as a root node for a network of sensors that generate data concerning an industrial process. By determining a network topology using the methods described herein the computing system 270 can more reliably receive data from the sensor network, there enabling greater control of the industrial process.

In one embodiment the device 200 is a sensor node in a sensor network for monitoring an industrial process. The sensor node may be configured to perform any number of functions including, but not limited to, quality control, predictive machinery maintenance and factory safety. Taking quality control as an example; the sensor module 240 may contain a camera that is capable of in-process inspection for quality control, thereby allowing the manufacturer to identify and resolve failures. In one embodiment, the sensor measurements are communicated to another sensor or machine in the sensor network which is capable of acting on this information, for example by displaying these measurements to a human operator of the industrial control system for interpretation.

Other uses outside of an industrial process are of course also possible. In fact, the methods and devices that are described herein can relate generally to any application of sensor technology, in particular to the Internet of Things (IoT), or more generally, to any wireless sensor network deployment comprising resource constrained sensors. For example, the methods and devices discussed herein could also be used in the healthcare sector where sensors are used for monitoring patient vitals.

Furthermore, despite the following description referring to sensor nodes, it is emphasized that the methods and devices discussed herein relate to any type of node that has an application in the Internet of Things (IoT) including sensor nodes, actuator nodes and nodes which are intended for relaying or processing data without any sensor or actuator capabilities.

Routing tree topology such as that shown in FIG. 1 may be calculated via centralized or distributed routing algorithms. Centralized routing algorithms collect information from the network at a central entity, compute a routing topology, and then disseminate this schedule back to nodes for its execution. In contrast, distributed routing algorithms making local routing decisions.

Routing topologies can be calculated according to link quality, energy efficiency, load balancing, network lifetime extension, latency and packet delivery ratio, etc.

Distributed Routing protocols, such as the IETF Routing Protocol for Low-Power and Lossy Networks (RPL) are commonly used and adopted in the 6TiSCH standard. RPL strikes a balance between link quality and hop counts. Although full details of the known IPv6 Routing Protocol for Low-Power and Lossy Networks (RPL) are available in the Internet Engineering Task Force (IETF) Request for Comments: 6550 which is incorporated herein by reference, the pertinent aspects of the prior art routing protocol, RPL, will be discussed below to enable comparison with the new approach to routing disclosed herein.

In the RPL protocol, the nodes of the DODAG are arranged according to the rank of each node. An example of this is shown in FIG. 1. A node's rank indicates the node's position in the routing topology relative to the root node. The rank of a node increases as edges (102, 104, 106) are traversed in the direction away from the root node. The rank of a node is computed in accordance with the routing protocols Objective Function (OF). The objective function describes how parents in the DODAG are selected and therefore how the network topology is formed.

RPL defines three control messages for use in the formation of a routing topology:

A Directed Acyclic Graph Information Objection (DIO) message. DIO messages carry information that allows a node to discover an RPL topology, learn its configuration parameters and select a parent from the DODAG;

A Directed Acyclic Graph Information Solicitation (DIS) message. DIS messages are used to solicit DIO messages from an RPL node, in essence a DIS message is used to discovery neighbours that are part of the DODAG; and A Destination Advertisement Object (DAO) message. DAO messages are used to propagate destination information upwards along the edges of the DODAG towards the root node.

Figure 3:
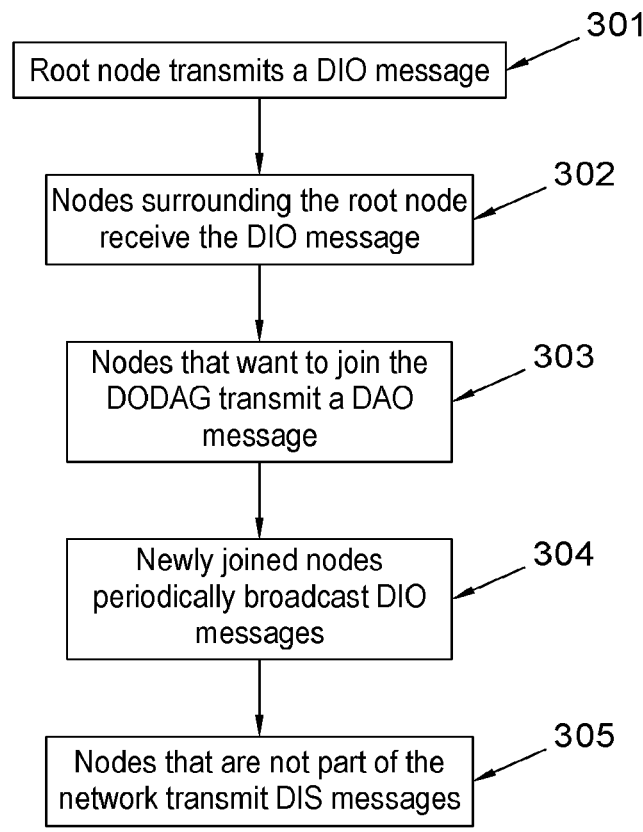
FIG. 3 shows a simplified example of a DODAG building process.

FIG. 3 shows a simplified example of a DODAG building process under RPL. The representation of the DODAG shown in FIG. 1 will also be used to explain the DODAG building process. FIG. 3 begins in step 301 with the root node 101 transmitting a DIO message. The DIO message is broadcast in order to advertise the DODAG to neighbouring sensor nodes and contains, amongst other things; the RPL Instance ID, the version number of the DODAG and the rank of the node transmitting the DIO message. In the case where a DIO message is transmitted by the root node, the rank will be zero by definition.

In step 302, nodes surrounding the root node receive the DIO message. In the representation of the DODAG shown in FIG. 1, only nodes 102, 108, 109 and 110 are within the range of the root node 101 and therefore only these nodes are able to receive the DIO message and ultimately join the DODAG. After receiving a DIO message from the root node 101, nodes 102, 108, 109 and 110 can join the network by adding the sender of the DIO message as a parent node.

In order to minimise the size of routing tables, RPL does not by default store a path from the root node to sensor nodes of the network. This can be problematic in situations where the root node needs to communicate with a sensor node. In order to address this RPL includes DAO messages. DAO messages are transmitted by a sensor node and are sent to the root node that records the path from the sensor node to the root node.

In step 303, nodes that want to join the DODAG transmit a DAO message. In the DODAG representation of FIG. 1, nodes 102, 108, 109 and 110 transmit DAO messages to the root node 101 if they want to install a path to themselves in the routing table of the network.

Upon joining the DODAG a node will determine its own rank based on the rank advertised in the DIO message received from the parent node. In the known routing protocol RPL, if a node receives DIOs from multiple neighbouring nodes the node will select a parent from the neighbouring nodes based on the node through which its resulting rank is the smallest.

Once a node has joined the DODAG it has a communication path to the root node via its parent node. Since a node only requires information about its parent to communicate with the root node, RTL requires very little information to communicate data. This characteristic is particularly advantageous for devices which are constrained in terms of processor and memory.

In step 304, the newly joined nodes (102, 108, 109 and 110) periodically broadcast DIO messages to enable neighbouring nodes which were not within the root node's range to join the sensor network. The DIO messages transmitted by the recently joined nodes (102, 108, 109 and 110) will not have the same contents as the DIO message transmitted by the root node in step 301. Since the recently joined nodes (102, 108, 109 and 110) are one hop removed from the root node 101 in the routing topology, the rank will need to be adjusted accordingly. In the simplified network topology shown in FIG. 1 the rank is incremented by one.

In RPL it is also possible to solicit DIO messages from neighbouring nodes that are already part of the DODAG. In step 305, nodes that are not part of the network transmit DIS messages. Any neighbouring station that receives a DIS message will transmit a DIO message, thereby enabling neighbouring nodes to join the DODAG.

As discussed above, particularly in relation to step 302, the rank of a node is used in the known routing protocol RPL in order to select a parent node and therefore form the routing topology. The rank represents an abstract distance to the root of the DODAG and is exchanged between nodes in order to avoid loops in the routing topology.

When a node joins a network in RPL its rank is calculated according to an objective function. Examples of prior art objective functions include Minimum Rank Objective Function (MRHOF) and Objective Function Zero (OF0). Objective Function Zero (OF0) is discussed in more detail in the Internet Engineering Task Force (IETF) Request for Comments 6552 which is incorporated herein by reference, however to summarise, the rank of a node, Rank(node), according to Objective Function Zero (OF0) is calculated by:

$$\text{Rank(node)} = \text{Rank(Parent)} + \text{Rank}_{increase} \quad (1)$$

$$\text{Rank}_{increase} = (Rf \times Sp + Sr) \times \text{MinHopRankIncrease} \quad (2)$$

Where:
Rank(Parent) is the rank of the parent node according to the received DIO message;
Rf is a configurable value known as the rank factor which is used to multiply the effect of the link property parameter on the rank increase computation;
Sp is a computed value that is based on the link properties (i.e. the connection quality) with a neighbouring node and is known as the step of rank;
Sr is a configurable value known as the stretch of rank and indicates a maximum augmentation to the step of rank. In common practice the stretch of rank is set to one; and
MinHopRankIncrease is a constant value corresponding to the minimum rank increase imposed for a hop in the DODAG.

As an example of the values used in equation 2, the MinHopRankIncrease could equal 100 and the product of W and L could equal 0.1 if the link is reliable and 0.3 if the link is lossy.

The criterion used for selecting a parent node varies depending on the objective function that is chosen. Despite this there are common trends amongst objective functions, namely; the greater the number of hops in a network (i.e. the number of intermediary nodes that need to be traversed to reach the root node) the higher the rank and consequently the less likely it will be that the node transmitting the DIO message will be selected as the parent node.

Determining a routing topology using an objective function such as OF0 strikes a balance between the link property metric (i.e. the quality of the wireless link to the potential parent node) and the hop count (i.e. the number of nodes between the potential parent node and the root node). As a result, in RPL, a shorter path comprising a smaller number of hops with poorer link property metrics will generally be preferred over a longer path with a greater number of hops between nodes with better link property metrics.

Figure 4:
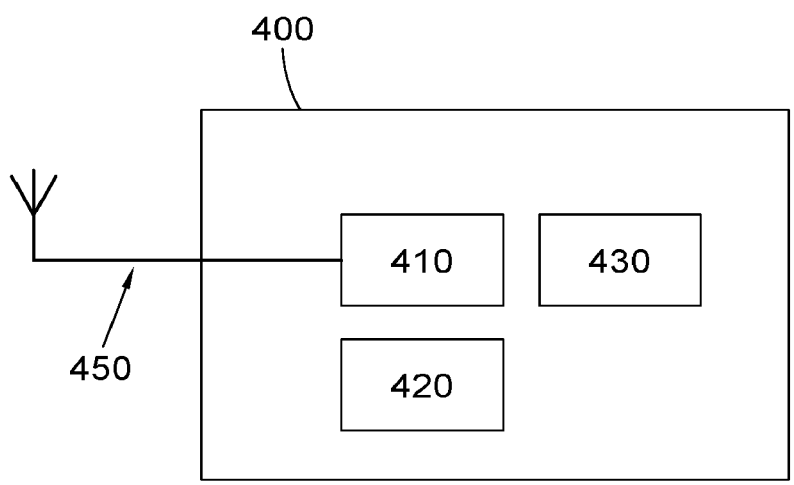
FIG. 4 shows a device 400, which forms the Path Computation Element of the sensor network according to an embodiment.

Centralized routing algorithms may also be applied to routing in 6TiSCH mesh networks, for example, for priority traffic that requires Quality of Service (QoS) guarantees. In mesh networks in which centralized routing algorithms are implemented, a centralized entity known as a Path Computation Element (PCE) computes an optimized routing path and corresponding schedule for 6TiSCH track allocation. FIG. 4 shows a Path Computation Element according to an embodiment. The PCE comprises and input/output module 410, a microprocessor 420, and a non-volatile memory 430. The input/output module 410 is communicatively connected to an antenna 450. The antenna 450 is configured to receive signals from, and transmit signals to, nodes in the sensor network. The microprocessor 420 is coupled to the input/output module 410 and to the non-volatile memory 430. The non-volatile memory 430 stores computer program instructions that, when executed, cause the processor 420 to execute program steps that implement the methods described herein, including but not limited to the calculation of a 6TiSCH track for the sensor network. In addition, the non-volatile memory 430 stores information regarding the properties of the nodes and links contained in the network in order to enable the microprocessor 420 to calculate the 6TiSCH track for the sensor network.

Whilst in the embodiment described above the antenna 450 is shown to be situated outside of, but connected to, the device 400 it will be appreciated that in other embodiments the antenna 450 forms part of the device 400. In further embodiments, the device 400 does not comprise an antenna but instead is communicatively connected to one of the network nodes 200.

In one embodiment the PCE 400 is configured to operate in accordance with the IETF 6TiSCH (IPv6 over IEEE 802.15.4e TSCH mode) standard.

Although FIG. 4 depicts the PCE as a separate hardware device, the PCE may be implemented entirely virtually. In an embodiment, the PCE a software module that sits within the DODAG root node (see above) or in the backend cloud of the system. Further details may be found in Internet Engineering Task Force (IETF) Request for Comments: 4655, which is incorporated herein by reference.

The DODAG building process outlined in FIG. 3 is equally applicable to centralised routing algorithms. In centralised routing algorithms, a database on which the PCE operates and includes information relating to path sensor node availability and link quality is created and maintained, thereby enabling the PCE to calculate optimal route topology. Protocols which enable the PCE to gather information regarding the 6TiSCH node capabilities in the network are implemented in order to compile the database on which the PCE operates. Examples include extensions to the IETF Traffic Engineering Architecture and Signaling (TEAs) protocol. Likewise, IETF protocols such as lightweight PCEP or an adaptation of CCAM GMPLS formats and procedures may be implemented in order to transmit details of the route topologies calculated by the PCE to the individual nodes, thereby enabling implementation of the route topology.

Existing 6TiSCH solutions typically determine data transmission schedules based on an assumption of having an optimal routing layer, i.e. based on an assumption of a relevant static network condition with all nodes and links assumed to be consistently available and stable, either physically (device/link wise) or virtually (resource wise). Any network changes due to link fluctuations, node failure events, or drain of device resources require re-computation of the route, incurring significant overheads. Moreover, at the onset of any change, channel resources are redistributed from previous routing paths to newly built paths. This usually leads to sudden drop in the traffic reliability and increase in end-to-end latency. Therefore, choosing a stable path with accessibility to nodes' resources along the path can be critical.

Figure 5:
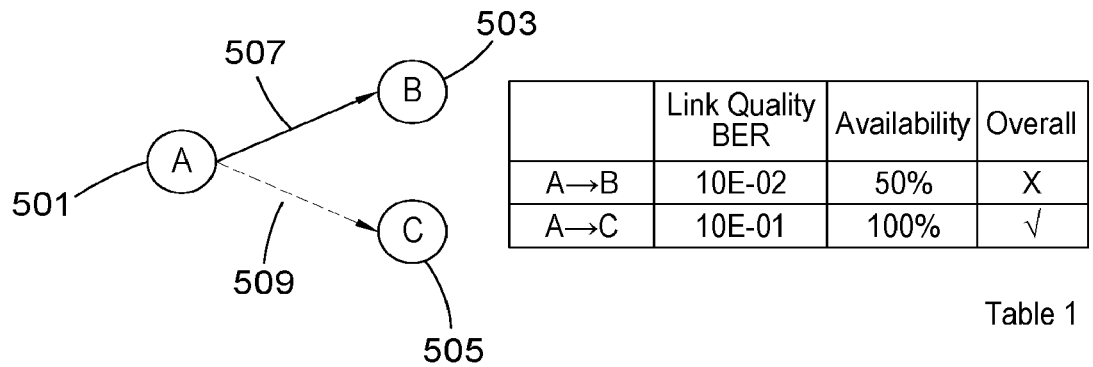
FIG. 5 shows an example of a routing topology which is affected by stability considerations.

FIG. 5 shows one example of a routing topology which is affected by stability considerations. While choosing a relay node for Node A 501, the link A→B 507 has a higher link quality with a lower BER (Bit Error Rate) compared with A→C 505, as shown in Table 1. However, the link A→B 507 is predicated to be only available for 50% of its operation time, whereas the link A→C 505 is predicted to be continuously available. If A→B 507 were chosen as the routing path and the link fluctuates very frequently with a 50% chance of becoming unavailable, it could have a very destructive impact on the network, requiring route recovery, re-computation of a new path and schedule, etc. In an embodiment, a routing topology which prioritizes stability is implemented and node C 505 is chosen as the relay node for node A 501.

In an embodiment, a STable and Reliable Routing protocol (STARR) is employed in the calculation of route topology. In this embodiment, a reliability metric and/or a stability and availability metric is/are employed in the calculation of route topology. These metrics are discussed in detail below.

Routing Metrics

Reliability Metric

In an embodiment, a reliability metric is employed in the selection of paths from source to destination given a particular network topology. In this embodiment, the reliability metric of an edge or path is a measure of its packet delivery rate at the edge or along a path, where an edge is a single hop between two nodes and a path comprises several hops between a plurality of nodes. In this embodiment, the packet delivery rate is defined as the performance of successful reception of fixed size protocol data unit (a packet) within a predefined time duration.

In an embodiment, the probability the probability that a packet transmitted from node i is correctly received at node j is estimated from information regarding the node capabilities in the network. We denote this probability by $p_{ij}$ and call this the success probability. The complement $1-p_{ij}$ is the loss probability.

As described above, in centralized routing in 6TiSCH networks protocols such as extensions to the IETF Traffic Engineering Architecture and Signaling (TEAs) protocol are implemented in order for the PCE to gather information regarding the 6TiSCH node capabilities in the network. In an embodiment, the data gathered includes data on the packet delivery rate. In an embodiment, the Receiver Signal Strength Indicator (RSSI) is employed to estimate the success and loss probabilities. In another embodiment the Link Quality Index (LQI) is employed to estimate the success and loss probabilities.

Minimising End-to-End Packet Loss Rate

In an embodiment, the reliability metric comprises the packet loss rate. A Bernoulli random variable $L_{ij}$ is defined such that $L_{ij}=0$ signifies the successful delivery of a packet on edge ij and $L_{ij}=1$ denotes the loss of a packet on the edge. Thus, $p_{ij}=\mathbb{P}(L_{ij}=0)$ and $1-p_{ij}=\mathbb{P}(L_{ij}=1)$.

The Packet Loss Rate (PLR) is defined as the average number of packets lost per transmission, i.e., the PLR for edge ij is $PLR_{ij}=1-p_{ij}$. The end-to-end PLR for the n-hop path $\mathcal{P} = \{i_0 i_1, i_1 i_2, \ldots, i_n i_{n-1}\}$ is thus $$PLR = \sum_{j=1}^{n} PLR_{i_{j-1} i_j} = \sum_{j=1}^{n} \left(1 - p_{i_{j-1} i_j}\right) = n - \sum_{j=1}^{n} p_{i_{j-1} i_j} \quad (3)$$

In an embodiment, the path with the lowest end-to-end PLR is chosen as the routing path.

Minimising the Average Number of Retransmissions

In an embodiment, the reliability metric comprises the average number of retransmissions which take place on a path P. In a 6TiSCH network, each time that a transmission of a packet on an edge fails, the transmitting node will attempt to retransmit.

A geometric random variable $R_{ij}$ is defined that takes values in the set of nonnegative integers. This random variable represents the number of retransmissions required on edge ij before a successful transmission is achieved. Hence, we have:

$$\mathbb{P}(R_{ij}=k) = (1-p_{ij})^k p_{ij} \qquad (4)$$

Note that we assume an infinite number of retransmissions can occur in this model. The average number of retransmissions on edge ij is thus $$\mathbb{E}[R_{ij}] = \sum_{k=0}^{\infty} k(1-p_{ij})^k p_{ij} = \frac{1-p_{ij}}{p_{ij}} \qquad (5)$$

The average number of retransmissions on path P can then be formulated as:

$$\bar{r}(\mathcal{P}) = \sum_{j=1}^{n} \mathbb{E}[R_{i_{j-1}i_j}] = \sum_{j=1}^{n} \frac{1-p_{i_{j-1}i_j}}{p_{i_{j-1}i_j}} = -n + \sum_{j=1}^{n} \frac{1}{p_{i_{j-1}i_j}} \qquad (6)$$

In an embodiment, the path with the lowest number of average retransmissions is chosen as the routing path.

Minimising the Maximum Edge Retransmission Saturation Probability

In an embodiment, the edge retransmission saturation probability is employed as a reliability metric. In this embodiment, again, each time that a transmission of a packet on an edge fails, the transmitting node will attempt to retransmit.

As in the preceding section, it is assumed that edge ij experiences a random number of retransmissions, denoted by $R_{ij}$. A retransmission threshold is defined as $\rho$. The probability that the number of retransmissions on edge ij exceeds the threshold $\rho$ is given by:

$$\mathbb{P}(R_{ij} > \rho) = 1 - \mathbb{P}(R_{ij} \leq \rho) \qquad (7)$$

$$= 1 - \sum_{k=0}^{\rho} (1-p_{ij})^k p_{ij}$$

$$= 1 - p_{ij}\frac{1-(1-p_{ij})^{\rho+1}}{1-(1-p_{ij})}$$

$$= (1-p_{ij})^{\rho+1}$$

This probability is the edge retransmission saturation probability (ERSP). In an embodiment, the path that contains the min-max ERSP is chosen as the routing path, i.e., the chosen path $\mathcal{P}^*$ is given by $$\mathcal{P}^* = \arg\min_{\mathcal{P}} \max_{ij\in\mathcal{P}} (1-p_{ij})^{\rho+1} \qquad (8)$$

Stability Metric

In an embodiment, a stability metric is employed in the selection of paths from source to destination given a particular network topology.

It is well known in the art that the notion of stability may quantified by calculating the entropy of some dynamic or random process. In an embodiment, we quantify path stability by calculating the entropy associated with resource availability, specifically the availability of a network device or path.

The availability of a network device or path is a measure of its accessibility. It is defined as the probability or a percentage of time that a given device or path is consistently accessible during its operation period, given the occurrence of random events or user or control application services. We denote this probability by $p_{a_{ij}}$.

Network stability is affected by both physical resource availability and virtual resource availability. The latter is particularly important in the case of multi-tenant networks, where multiple tracks are overlaid among each other over the same physical network. The availability of virtual 6TiSCH radio resources in terms of time and channel assigned to multiple different 6TiSCH tracks is therefore important in such networks as the busier one link in the network becomes, the less likely it is to be accessible.

Examples of events affecting the physical network availability include, but are not limited to:
Node failure/Link failure
Node mobility
Significant fading and shadowing caused by a mobile obstacle
External Interference Examples of events affecting virtual network availability include, but are not limited to:
Memory, CPU usage of network devices.
Radio resources availability of network devices.
Service availability for multi-tenant networks.

In an embodiment, the probability $p_{a_{ij}}$ is calculated by making accessibility predictions from device or path statistics over a predefined time window $\Delta_t$. Several methods of performing such a calculation are known in the art. One example is given in R. Yanggratoke et al., "Predicting real-time service-level metrics from device statistics," 2015 IFIP/IEEE international Symposium on Integrated Network Management (IM), Ottawa, ON, 2015, pp. 414-422.

In this embodiment the path entropy is defined in terms of the joint distribution of edge states in a given path. Taking a path $\mathcal{P} = \{i_0 i_1, i_1 i_2, \ldots, i_n i_{n-1}\}$, the state of this path can be written in terms of the individual edge states as:

$$SL = (SL_{i_0 i_1}, SL_{i_1 i_2}, \ldots, SL_{i_{n-1} i_n}) \qquad (9)$$

where $SL_{ij}$ is a Bernoulli random variable that indicates the stability of a link with inaccessible ($SL_{ij}=1$) or accessible ($SL_{ij}=0$) states defined. The path entropy is thus defined as:

$$H(SL) = \sum_{ij\in\mathcal{P}} H(SL_{ij}) = \sum_{ij\in\mathcal{P}} H_2(p_{a_{ij}}). \qquad (10)$$

Where $H_2(x) = -x\log_2 x - (1-x)\log_2(1-x)$ (11) is the binary entropy function. Here, we assume that the different edge states in a path are statistically independent. When $p_{a_{ij}}=\frac{1}{2}$, the binary entropy function attains its maximum value 1, meaning the most unstable situation. A value of $p_{a_{ij}}$ larger or smaller than $\frac{1}{2}$, gives a more stable result, meaning the path or device is most likely to be accessible or completely inaccessible. This function is shown as the solid line in FIG. 6.

In practical terms for route topology calculation, it is clearly not desirable for a path or device to be inaccessible for large periods of time, even if it is stable when compared with other paths. In order to take account of this, in an embodiment, equation (11) is modified as:

$$\tilde{H}_2(x) = \begin{cases} -x \log_2 x - (1-x) \log_2(1-x) & 0 \le x \le 0.5 \\ 1 & \text{otherwise} \end{cases} \quad (12)$$

Figure 6:
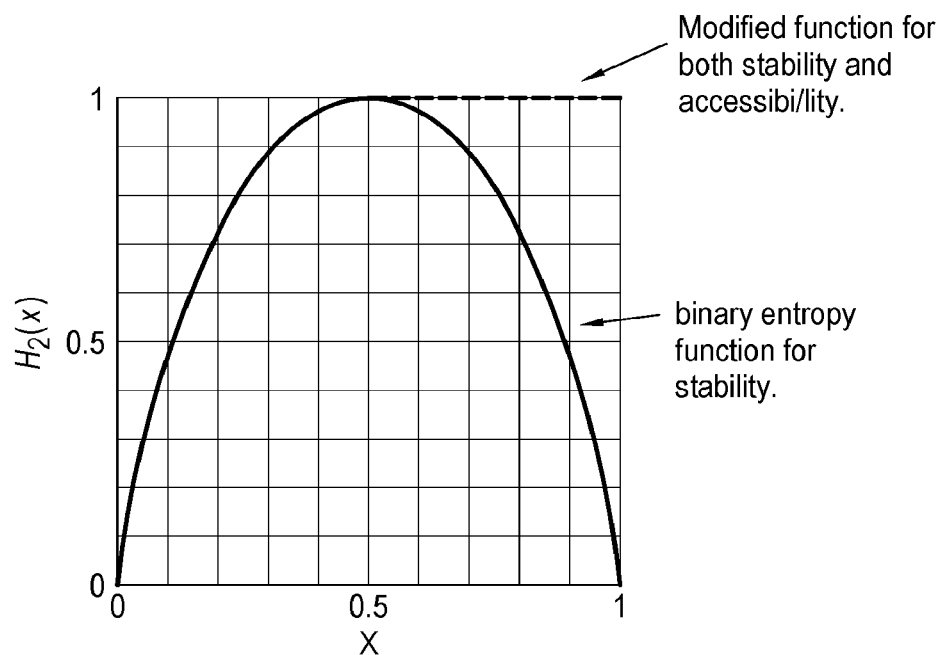
FIG. 6 shows a modified entropy function according to an embodiment.

This function is shown by the dotted lines in FIG. 6. $\tilde{H}_2(x)$ accounts for both stability and accessibility.

In an embodiment, H(SL) is employed as the stability metric and the path corresponding to minimum H(SL), i.e. minimum $$H(SL) = \sum_{ij \in \mathcal{P}} H(SL_{ij}) = \sum_{ij \in \mathcal{P}} \tilde{H}_2(p_{a_{ij}}) \quad (13)$$

is chosen as the routing path.

Centralised Routing

In an embodiment, the route topology (6TiSCH track) is calculated centrally in the Path Computation Element (PCE) unit.

In an embodiment, either a reliability metric or a stability metric is be employed in the calculation of route topology in the PCE. In this embodiment, the route topology is chosen as described above for the selected metric; i.e. the relevant metric for each path is calculated and the path with the metric corresponding to greatest reliability or greatest stability and accessibility, as appropriate is chosen. Thus, the path with lowest end-to-end PLR, lowest number of average retransmissions, minimum maximum ERSP or lowest entropy (H(SL)) is selected as the routing path.

In an embodiment, both a reliability metric and a stability metric are employed together in the centralized selection of route topology, i.e. both objectives are considered in route selection. The use of two metrics simultaneously to calculate route topology is discussed below.

Single-Objective Optimisation

In an embodiment a so-called single-objective optimisation approach is employed for path selection according to both reliability and stability and accessibility objectives.

In this embodiment, a weighted sum of objectives is minimized in order to select an optimal route, i.e.

$$\min_{\mathcal{P}} \omega f_1(\mathcal{P}) + (1-\omega) f_2(\mathcal{P}) \quad (14)$$

$$\text{s.t. } \mathcal{P} \in \mathcal{G}$$

where $f_1(\mathcal{P})$ the reliability metric chosen from among the end-to-end packet loss rate (see Equation (3)), the average number of retransmissions (see Equation (6)) and the maximum edge retransmission saturation probability (see Equations (7) and (8)); $f_2(\mathcal{P})$ is the stability metric, H(SL) given by Equation (13); $\omega \in [0,1]$ is the weight; and $\mathcal{G}$ is the graph that defines the set of all paths. In this embodiment, co is chosen prior to carrying out the optimisation.

The choice of co will depend on a number of factors including but not limited to, application requirements, resource availability, network connectivity, node density etc.

In an embodiment, a primary objective may be to determine the most reliable route and the secondary objective may be to choose a stable route. In this embodiment $\omega > 0.5$.

Multi-Objective Optimisation

In an embodiment, both stability and reliability objectives are considered simultaneously. In an embodiment, this is achieved by determining the set of paths that satisfy Pareto optimality, also known as the non-dominated set. Pareto optimality is achieved by a set of paths for which each path in the set is at least as good (in terms of the two objectives) as other paths not in the set, and for which selection of another path in order to improve one objective is not possible without a worsening of the other objective. Pareto optimality is well known in the art and, as such, will not be discussed in detail here. A number of methods for determining Pareto optimal sets are known in the art. One example is genetic algorithms.

In an embodiment, the route topology is determined by the heuristic selection of a single path from the Pareto optimal set of paths.

Example

Figure 7A:
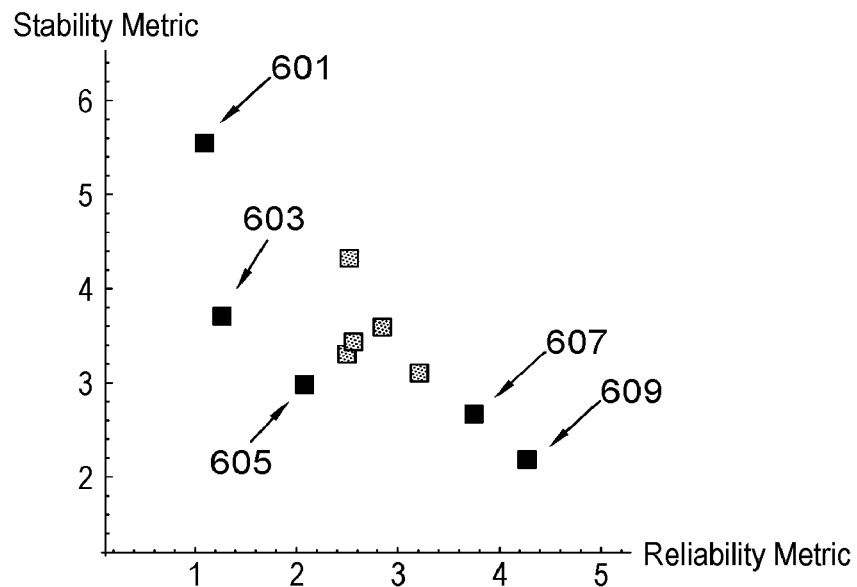
FIG. 7A shows a graphs showing the stability metric plotted against a reliability metric calculated according to an embodiment for ten exemplary routes through a sensor network.
Figure 7B:
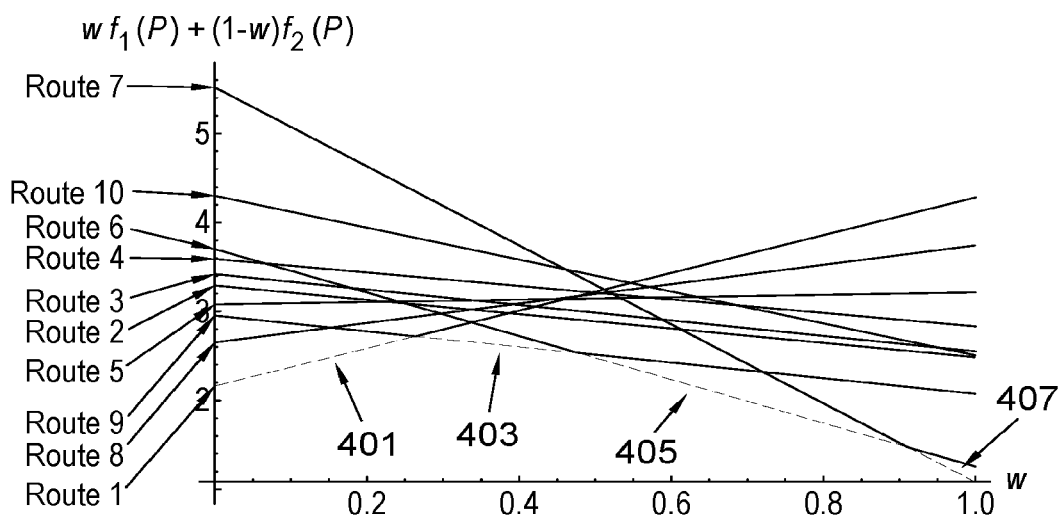
FIG. 7B shows a graph showing the RPL objective function for the same ten exemplary routes calculated according to an embodiment as a function of the weighting parameter between stability and a reliability metrics.

An example to which single-objective and multi-objective approaches have been applied is shown in FIG. 7A and 7B. In this example, ten routes from a source to destination were randomly generated to have lengths between four and six hops. The PLR for each link in each path was chosen uniformly at random. The end-to-end PLR reliability metric and stability metric were computed for each path. The results are shown in the table below:

| Route number | Reliability (end-to-end PLR) Metric | Stability Metric |
| --- | --- | --- |
| 1 | 4.27479 | 2.17225 |
| 2 | 2.49023 | 3.28945 |
| 3 | 2.5523 | 3.41474 |
| 4 | 2.83023 | 3.58244 |
| 5 | 3.20416 | 3.07999 |
| 6 | 1.2643 | 3.69808 |
| 7 | 1.08661 | 5.52928 |
| 8 | 3.74323 | 2.64761 |
| 9 | 2.07722 | 2.9557 |
| 10 | 2.51009 | 4.30022 |

The stability and reliability metrics are plotted against each other in FIG. 7A; the Reliability metric is given on the x-axis (denoted "Reliability metric" for brevity) while the y-axis indicates the value of the stability metric. As can be seen from the graph, for each of the paths represented by points 601, 603, 605, 607 or 609 (corresponding to paths 7, 6, 9, 8 and 1 respectively), no other path exists with a lower stability metric which does not also have a higher reliability metric (and vice-versa), i.e. for these paths it is not possible to choose a path with improved stability without suffering from a decrease in reliability. These paths therefore represent the non-dominated set and are indicated in FIG. 7A by solid squares. As can be seen from FIG. 7A, several paths within this set provide very low end-to-end PLR at the cost of being unstable, while others are stable but experience a high end-to-end PLR. The paths which do not belong to the non-dominated set are indicated by shaded squares.

FIG. 7B shows the weighted single-objective optimisation approach applied to the same set of paths. The objective function is plotted for each route as a function of the weight parameter w; these are shown by the solid lines. The dashed line indicates the minimum of the set of lines. We observe that different routes satisfy the minimum criterion for different subintervals of $w \in [0, 1]$. For example, in the region indicated by 401, route 1 is the minimum, route 9 is the minimum in the subinterval indicated by 403, route 6 in the subinterval indicated by 405 and route 7 in the subinterval indicated by 407. Also, note that, for example, route 8 is not captured by this approach, i.e., by using the linear weighted optimisation approach, we would never choose route 8.

Referring back to FIG. 7A, this omission is a result of the fact that the data point corresponding to this route lies to the right of the left-hand boundary (i.e., the convex interpolation of the Pareto front) of the convex hull of the total set of points.

Decentralized Routing

In an embodiment, the stability and accessibility metric is integrated into an existing decentralised mesh routing algorithm. In an embodiment, the stability and accessibility metric is integrated into the RPL protocol adopted in IETF 6TiSCH standard (see discussion above).

As discussed above, under 6TiSCH, the IETF RPL (IPv6 Routing Protocol for Low-Power and Lossy Networks) protocol is adopted as its routing algorithm to form a hierarchical tree topology. When a node joins a network in RPL its rank is calculated according to an objective function. Examples objective functions known in the art include Minimum Rank Objective Function (MRHOF) and Objective Function Zero (OF0).

In an embodiment, the modified binary entropy function Equation (12) is incorporated into the calculation of rank (see Equations (1) and (2)) as $$\text{Rank}_{increase} = (Rf \times Sp + Sr + Sa * H(SL_{NodeParent})) \times \quad (15)$$
$$MinHopRankIncrease$$
$$= (Rf \times Sp + Sr + Sa * \tilde{H}_2(p_{a_{NodeParent}})) \times$$
$$MinHopRankIncrease$$

Where Sa is a configurable weight between defined RPL objective function metric and availability metric.

Example

Figure 8:
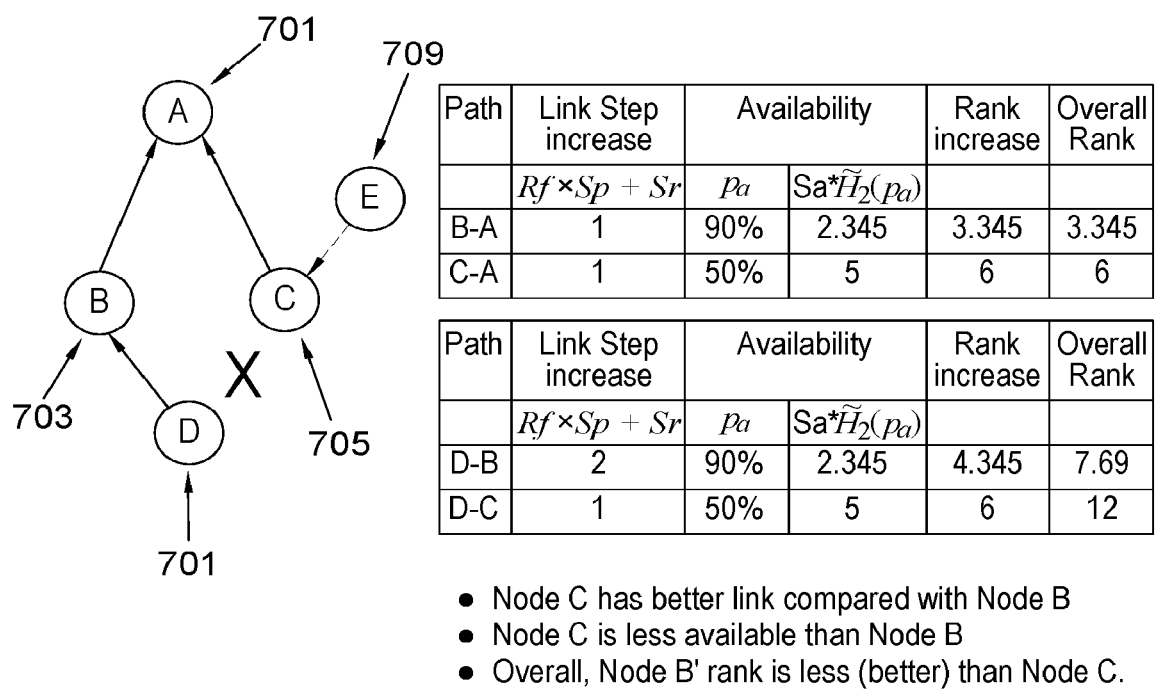
FIG. 8 shows route selection according to an embodiment through a network comprising five nodes.

FIG. 8 shows an arrangement of five nodes A 701, B 703, C 705, D 707 and E 709. Two possible routes exist for the transmission of data from node D 707 to node A 701: a first via node B 703 and a second via node C 705.

In this example, Node B 703 is available 90% of the time but node C 705 has lower availability, being occupied some for some portion of time relaying high priority traffic from Node E 709, as indicated in the table. Over a monitoring time window of $\Delta_t$=30 seconds, it is assumed that on average 15 seconds of time Node C could be fully occupied by relaying high priority traffic from Node E. Hence, the accessibility of $p_{a_{CA}}$ and $p_{a_{DC}}$ are both 50%.

Further, in this example, the connection quality between nodes D 707 and C 705, B 703 and A 791, and C 705 and A 701 is assumed better than that between D 707 and B 703. In this example, Rf×Sp=1 for the connection between nodes D 707 and B 703 and Rf×Sp=0 for all other connections shown in FIG. 8.

In this example, the stability metric is applied to RPL in order to determine the ranking of a node and therefore determine the choice of path for data transmission between node D 707 and node A 701. For simplicity, it is assumed that in Equation (12) above, Sr=1, MinHopRankIncrease=1 and the Sa weighting parameter is set to 5. Please not that these numbers are used as examples only; in an embodiment, the weight parameter is optimized for real applications.

The tables in FIG. 8 show the connection rankings for each of the connections of this example, calculated according to an embodiment.

The default RPL ranking is (i.e. where no account of stability is taken) is shown in the column entitled "Link Step Increase". The rank calculated in according to an embodiment using Equation (15), i.e. by taking stability and accessibility into account is shown in the column entitled "overall rank".

The stability metric values are shown in the "Availability" column and are calculated using Equation (12) above. In the case of connections with node C 705, $\tilde{H}_2$ (½)=−½*log$_2$ (½)−(1−½)log$_2$ (1−½)=1. In contrast, connections with node B 703, which is available most of the time ($p_{a_{BA}}$=$p_{a_{DB}}$=90%), have a much lower entropy function value of 0.469. As a result, the first step of rank increases for link B-A and link C-A are 3.345 and 6, respectively. The subsequent rank increases for links D-B and D-C are 4.345 and 6, respectively. Thus, although the link D-C is of better quality than the link D-B, the overall ranking of Node C is much higher than Node B. Consequently, Node B is chosen as the best candidate for transmissions from Node D according to the RPL objective function.

Note that, if availability had not been taken into account in this calculation, Node C would have been chosen as the best candidate for transmissions, as can be seen from the "Link Step Increase" column.

The routing methodology disclosed herein has a number of advantages not least that STARR incorporates end-to-end reliability and link stability/availability into route metrics thereby enabling selection of a stable path which minimises the end-to-end packet loss rate. In particular, path entropy is adopted to model the availability of the links in the network either physically or virtually (resource wise). STARR can be applied to either decentralized routing protocols such as RPL or centralized route and path computation (i.e. 6TiSCH Track allocation).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. An apparatus configured to compute a routing path from a source node to a destination node across a mesh network comprising a plurality of nodes, the apparatus comprising:
    an interface configured to communicate with one or more nodes in the network;
    a memory configured to store data regarding stability and availability of individual nodes in the network to receive and transmit packet data; and
    a controller configured to:
        employ the data regarding the stability and availability of individual nodes in the network to receive and transmit packet data to calculate path stability metrics for a plurality of potential routing paths between the source node and the destination node,
        employ the path stability metrics to select one of the plurality of potential routing paths for data transmission between the source node and the destination node, and
        cause the interface to transmit a signal configured to cause the plurality of nodes to transmit data from the source node to the destination node via the selected route, wherein the controller is configured to calculate the path stability metrics for a plurality of potential routing paths between the source node and the destination node by calculating the path entropy for each potential routing path,
wherein the path entropy H(SL) for a routing path $\mathcal{P} = \{i_0 i_1, i_2, \ldots i_n i_{n-1}\}$ is calculated using the following equation:

$$H(SL) = \sum_{ij \in \mathcal{P}} H(SL_{ij}) = \sum_{ij \in \mathcal{P}} \tilde{H}_2(p_{a_{ij}})$$

where $$\tilde{H}_2(x) = \begin{cases} -x \log_2 x - (1-x) \log_2(1-x) & 0 \le x \le 0.5 \\ 1 & \text{otherwise} \end{cases},$$

$SL_{ij}$ is a Bernoulli random variable that indicates whether or not the path between nodes i and j is inaccessible ($SL_{ij}=1$) or accessible ($SL_{ij}=0$), and $p_{a_{ij}}$ is the probability that the path between nodes i and j is accessible.

2. The apparatus according to claim 1, wherein the controller is configured to employ the path stability metrics to select one of the potential routing paths for data transmission between the source node and the destination node by choosing the path with a value of one of the path stability metrics, the value corresponding to the path with greatest availability.

3. An apparatus configured to compute a routing path from a source node to a destination node across a mesh network comprising a plurality of nodes, the apparatus comprising:
an interface configured to communicate with one or more nodes in the network;
a memory configured to store data regarding the stability and availability of individual nodes in the network to receive and transmit packet data; and
a controller configured to:
employ the data regarding the stability and availability of individual nodes in the network to receive and transmit packet data to calculate path stability metrics for a plurality of potential routing paths between the source node and the destination node,
employ the path stability metrics to select one of the plurality of potential routing paths for data transmission between the source node and the destination node, and
cause the interface to transmit a signal configured to cause the plurality of nodes to transmit data from the source node to the destination node via the selected route,
wherein the memory is further configured to store data regarding the packet loss rate between individual nodes in the network, and wherein the controller is further configured to:
employ the data regarding the packet loss rate between individual nodes in the network to calculate path reliability metrics for a plurality of potential routing paths between the source node and the destination node,
employ the path reliability metrics in combination with the path stability metrics to select one of the plurality of potential routing paths for data transmission between the source node and the destination node,
wherein the reliability metrics comprise the maximum edge retransmission saturation probabilities.

4. An apparatus configured to compute a routing path from a source node to a destination node across a mesh network comprising a plurality of nodes, the apparatus comprising:
an interface configured to communicate with one or more nodes in the network;
a memory configured to store data regarding the stability and availability of individual nodes in the network to receive and transmit packet data; and
a controller configured to:
employ the data regarding the stability and availability of individual nodes in the network to receive and transmit packet data to calculate path stability metrics for a plurality of potential routing paths between the source node and the destination node,
employ the path stability metrics to select one of the plurality of potential routing paths for data transmission between the source node and the destination node, and
cause the interface to transmit a signal configured to cause the plurality of nodes to transmit data from the source node to the destination node via the selected route,
wherein the memory is further configured to store data regarding the packet loss rate between individual nodes in the network, and wherein the controller is further configured to:
employ the data regarding the packet loss rate between individual nodes in the network to calculate path reliability metrics for a plurality of potential routing paths between the source node and the destination node,
employ the path reliability metrics in combination with the path stability metrics to select one of the plurality of potential routing paths for data transmission between the source node and the destination node wherein the controller is configured to employ the path stability metrics in combination with the path reliability metrics to select one of the plurality of potential routing paths for data transmission between the source node and the destination node by determining the set of paths that satisfy Pareto optimality with regard to the stability metrics and the reliability metrics.

5. A wireless apparatus for wireless transmission over a mesh network, the network comprising a plurality of nodes configured to forward messages towards and away from a root node, wherein the nodes are each assigned a rank, the rank assigned to each node determining the path by which messages are forwarded towards the root node, the wireless apparatus comprising:
a wireless interface configured to wirelessly communicate with nodes in the network; and
a controller configured to:
receive, via the wireless interface, a message from a first node,
wherein the message comprises first information, wherein the first information relates to the rank of the first node and stability and availability of the first node to receive messages from the wireless apparatus;
receive, via the wireless interface, a message from a second node,
wherein the message comprises second information, wherein the second information relates to the rank of the second node and stability and availability of the second node to receive messages from the wireless apparatus;

select, on the basis of the first information and the second information, whether to forward a message towards the root node via the first node or via the second node;

cause the interface to transmit the message to the selected node, wherein the controller is configured to select on the basis of the first and second information whether to forward a message towards the root node via the first node or via the second node by:

calculating a first entropy for transmission of information between the wireless apparatus and the first node and a second entropy for the transmission of information between the wireless apparatus and the second node, calculating a first rank for the wireless apparatus as a function of the first entropy and the rank of the first node, wherein the first rank increases as the first entropy and/or the first rank of the first node from the root node increases, calculating a second rank for the wireless apparatus as a function of the second entropy and the rank of the second node, wherein the second rank increases as the second entropy and/or the rank of the second node, and selecting to forward a message towards the root node via the first node if the first rank is lower than the second rank and selecting to forward a message towards the root node via the second node if the second rank is lower than the first rank, wherein the first entropy and the second entropy are calculated according to the following equation:

$$\tilde{H}_2(x) = \begin{cases} -x \log_2 x - (1-x) \log_2(1-x) & 0 \leq x \leq 0.5 \\ 1 & \text{otherwise} \end{cases}$$

where x is the probability that the transmission of information between the wireless apparatus and the first node or the second node, as appropriate, is possible.

6. A method for computing a routing path from a source node to a destination node across a mesh network comprising a plurality of nodes, the method comprising:

employing data regarding stability and availability of individual nodes in the network to receive and transmit packet data to calculate path stability metrics for a plurality of potential routing paths between the source node and the destination node;

employing the path stability metrics to select one of the plurality of potential routing paths for data transmission between the source node and the destination node;

transmitting a signal configured to cause the plurality of nodes to transmit data from the source node to the destination node via the selected route, wherein a controller is configured to calculate the path stability metrics for a plurality of potential routing paths between the source node and the destination node by calculating the path entropy for each potential routing path, wherein the path entropy H(SL) for a routing path $\mathcal{P} = \{i_0 i_1, i_2, \ldots i_n i_{n-1}\}$ is calculated using the following equation:

$$H(SL) = \sum_{ij \in \mathcal{P}} H(SL_{ij}) = \sum_{ij \in \mathcal{P}} \tilde{H}_2(p_{a_{ij}})$$

where $\tilde{H}_2(p_{a_{ij}})$ is an entropy function outputting an entropy, $SL_{ij}$ is a Bernoulli random variable that indicates whether or not the path between nodes i and j is inaccessible ($SL_{ij}=1$) or accessible ($SL_{ij}=0$), and $p_{a_{ij}}$ is the probability that the path between nodes i and j is accessible, wherein the entropy function attains a maximum value 1 in $0.5 \leq p_{a_{ij}}$.

7. A method at least partially performed by a wireless apparatus for wireless transmission over a mesh network, the network comprising a plurality of nodes configured to forward messages towards and away from a root node, wherein the nodes are each assigned a rank, the rank assigned to each node determining the path by which messages are forwarded towards the root node, the method comprising:

receiving a message from a first node, wherein the message comprises first information, wherein the first information relates to the rank of the first node and stability and availability of the first node to receive messages from the wireless apparatus;

receiving a message from a second node, wherein the message comprises second information, wherein the second information relates to the rank of the second node and stability and availability of the second node to receive messages from the wireless apparatus;

selecting on the basis of the first information and the second information, whether to forward a message towards the root node via the first node or via the second node;

transmitting the message to the selected node;

wherein the selecting on the basis of the first information and the second information whether to forward a message towards the root node via the first node or via the second node comprising:

calculating a first entropy for transmission of information between the wireless apparatus and the first node and a second entropy for the transmission of information between the wireless apparatus and the second node, calculating a first rank for the wireless apparatus as a function of the first entropy and the rank of the first node, wherein the first rank increases as the first entropy and/or the first rank of the first node from the root node increases, calculating a second rank for the wireless apparatus as a function of the second entropy and the rank of the second node, wherein the second rank increases as the second entropy and/or the rank of the second node, and selecting to forward a message towards the root node via the first node if the first rank is lower than the second rank and selecting to forward a message towards the root node via the second node if the second rank is lower than the first rank, wherein the first entropy attains a maximum value 1 in $0.5 \leq x$ and the second entropy attains a maximum value 1 in $0.5 \leq y$, wherein x is a probability of the transmission of information between the wireless apparatus and the first node, y is a probability of the transmission of information between the wireless apparatus and the second node.

\* \* \* \* \*